United States Patent [19]

Yabase

[11] Patent Number: 4,547,707
[45] Date of Patent: Oct. 15, 1985

[54] DEFLECTION YOKE APPARATUS

[75] Inventor: Koji Yabase, Urawa, Japan

[73] Assignee: Denki Onkyo Company Limited, Tokyo, Japan

[21] Appl. No.: 499,840

[22] Filed: Jun. 1, 1983

[30] Foreign Application Priority Data

Jun. 1, 1982 [JP] Japan .................................. 57-93794

[51] Int. Cl.⁴ ........................ H01J 29/70; H01J 29/76
[52] U.S. Cl. .................................................... 315/368
[58] Field of Search ................ 315/368; 335/213, 214; 313/412

[56] References Cited

U.S. PATENT DOCUMENTS

| 3,287,605 | 11/1966 | McGlashan | 335/213 |
| 3,821,591 | 6/1974 | Lister | 315/368 |
| 3,912,970 | 10/1975 | Chandler et al. | 335/213 |
| 4,028,586 | 6/1977 | Mengle | 315/368 |
| 4,090,110 | 5/1978 | Ogawa et al. | |
| 4,097,784 | 6/1978 | Fischman et al. | 315/368 |

Primary Examiner—Theodore M. Blum

Attorney, Agent, or Firm—Armstrong, Nikaido, Marmelstein & Kubovcik

[57] ABSTRACT

The deflection yoke apparatus comprises the deflection yoke and the correction coil device which is fitted to the deflection yoke. The deflection yoke is provided with a pair of horizontal deflection coils and a pair of vertical deflection coils which are electrically separated from one another by the coil separator, and the deflection core made of magnetic material and is constructed so that the deflection magnetic field is generated in which the misconvergence of rasters appearing on the screen when three electron beams in the in-line arrangement are deflected is of only the horizontal component. The correction coil device comprises a pair of magnetic cores and correction coils wound around the pair of magnetic cores and shifts the both-side electron beams in the horizontal direction when the paraboloidal wave current is supplied to dynamically converge the electron beams in the full range of the screen. The convergence is adjusted by the variable resistor which is attached to the deflection yoke to adjust the correction current.

6 Claims, 10 Drawing Figures

DEFLECTION YOKE APPARATUS

BACKGROUND OF THE INVENTION

The present invention ralates to the deflection yoke, particularly the precision deflection yoke suitable for high precision television sets, cathode-ray tube (CRT) display unit, etc.

As well known, the color cathode-ray tube in which three electron guns are arranged in-line is generally employed in the television receiver sets, video monitors, CRT display units, etc. The delection yoke which is mounted on the cathode-ray tube for deflecting the electron beams is constructed so that the horizontal deflection coils generate a pincushion type deflection magnetic field as a whole and the vertical deflection coils generate a barrel type deflection magnetic field. Thus, the misconvergence can be theoretically eliminated by constructing the deflection yoke as described above. However, it is difficult to materialize the theoretical deflection magnetic field due to the construction of the cathode-ray tube, for example, the curvature of the fluorescent scope and the tilt of the electron beams, dimensional error in the assembly workmanship during manufacturing, and the construction of the deflection yoke, for example, the impossibility of obtaining a desired conductor distribution of the deflection coil in the manufacturing processes.

Accordingly the misconvergence actually takes place in various types of patterns. For example, if the electron beams are deflected by the deflection magnetic field described above as shown in FIG. 1, a cross misconvergence PQv is caused at a position in the Y-axis direction on the screen and a paraboloidal misconvergence $X_H$ is caused at a position in the X-axis direction.

Conventionally, the deflection magnetic field is corrected for eliminating the misconvergence by changing the conductor distribution of the deflection coil through design modification or by generating the correction magnetic field with a permanent magnet or a magnetic element attached to the deflection yoke. However it is difficult to eliminate the cross misconvergence PQv. Moreover, since the amount of misconvergence differs with the cathode-ray tube and the deflection yoke which are to be combined, the pattern of correction should be determined for each type of combination. Therefore the yield rate of the deflection yoke cannot be effectively improved; particularly, as to the cathode-ray tube for displaying the characters, the yield rate of the deflection yoke more deteriorates since the permissible range or error is small.

SUMMARY OF THE INVENTION

An object of the present invention is to provide a deflection yoke apparatus which permits easy and precision adjustment of the misconvergence when it is mounted on the cathode-ray tube.

Another object of the present invention is to provide a deflection yoke apparatus capable of obtaining a satisfactory convergence over the full range of the screen by causing the amount of trilemma, which necessarily remains for a constructional reason of the deflection yoke, to be generated as the misconvergence resulting from only the horizontal component and correcting this amount of trilemma by the correction coil device.

Another further object of the present invention is to provide a deflection yoke apparatus capable of obtaining a satisfactory convergence over the full range of the screen by attaching the correction coil device to the deflection yoke, regardless of the difference in the amount of misconvergence which takes place from each combination of the cathode-ray tube and the deflection yoke.

In the deflection yoke apparatus in accordance with the present invention, the deflection yoke comprises a coil separator consisting of an insulation material formed as a cylindrical member by combining a pair of half pieces, a pair of saddle type horizontal deflection coils arranged inside the coil separator, an annular deflection core arranged outside the coil separator and made of a magnetic material and a saddle type vertical deflection coil arranged between the coil separator and the deflection core or a vertical deflection coil toroidally wound around the deflection core, and is constructed so that the horizontal deflection coils generate the pincushion type horizontal deflection magnetic field and the vertical deflection coil generates the barrel type vertical deflection magnetic field when the current is supplied. These deflection coils are constructed so that the rasters appearing on the screen produce the misconvergence of the horizontal component when three electron beams are deflected by the deflection magnetic field which is generated by the deflection coils. A pair of correction coil devices attached to the deflection yoke have a pair of magnetic cores and a pair of correction coils wound around the magnetic cores and are attached to the coil separator while being aranged to oppose each other in the direction of in-line arrangement of the electron guns, that is, at both outsides of the neck of the cathode-ray tube in the horizontal direction. The correction magnetic field generated from the correction coil device can shift the electron beams located at both sides of the center in the horizontal direction when the correction current from the correction current source connected to the vertical deflection coil is supplied, and the amount of shift of the electron beams can be adjusted by changing the correction current supplied to the correction coil. The magnitude of the correction current can be varied by the current varying means attached to the deflection yoke.

DETAILED DESCRIPTION OF THE INVENTION

Figure 1:
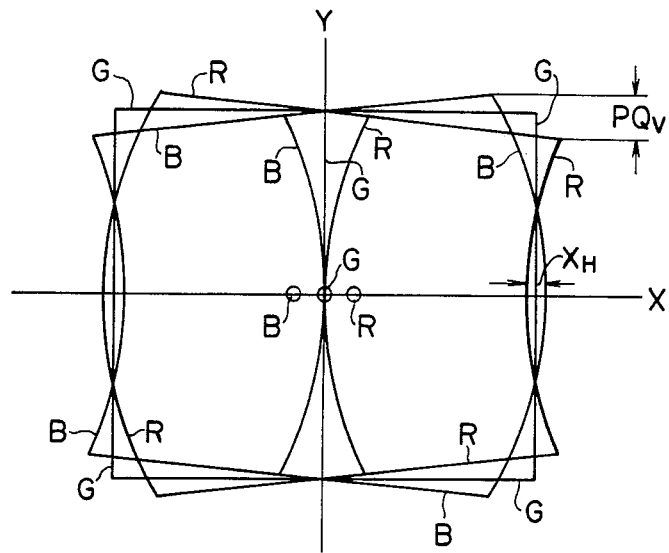
FIG. 1 shows a misconvergence of rasters appearing on the screen when the electron beams are deflected by the conventional deflection yoke.
Figure 2:
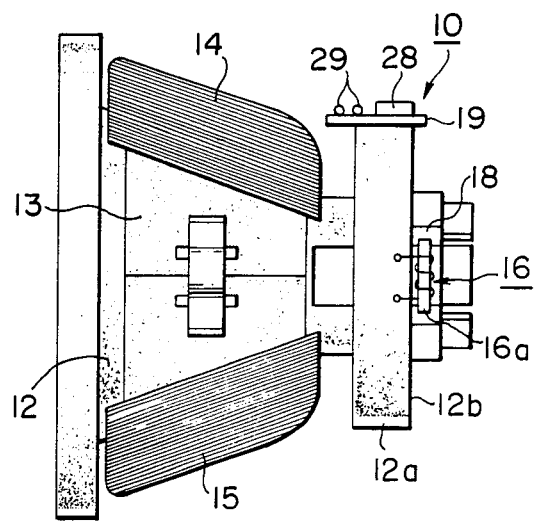
FIG. 2 is a side view of the deflection yoke apparatus in accordance with the present invention.
Figure 3:
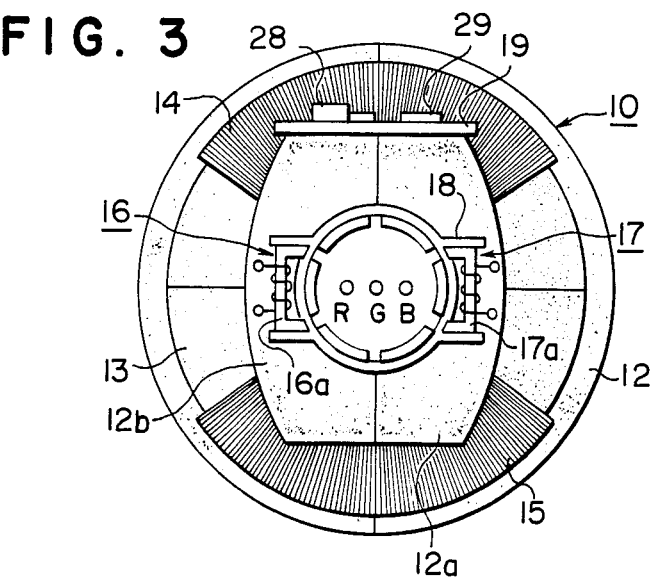
FIG. 3 is a view of the deflection yoke in accordance with the present invention as viewed from the electron gun side.
Figure 6:
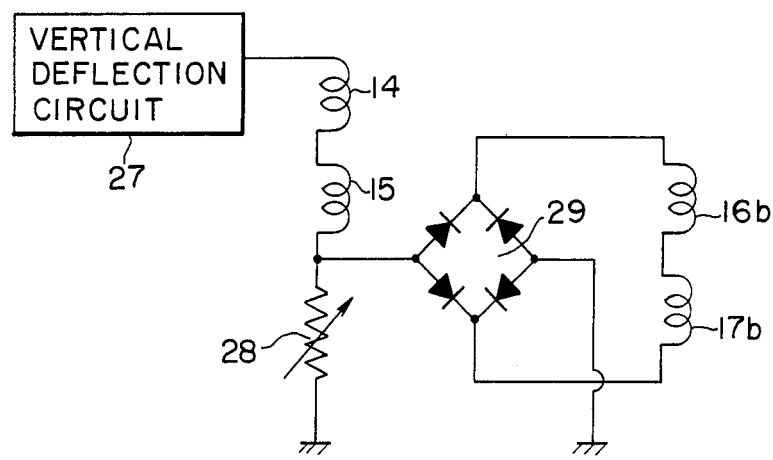
FIG. 6 shows an example of practical circuit connection of the correction coil device included in the deflection yoke apparatus in accordance with the present invention.

In FIGS. 2 and 3, the deflection yoke apparatus 10 comprises a pair of saddle type horizontal deflection coils, which are not shown, provided inside the cylindrical coil separator 12 made of a plastic material, a pair of vertical deflection coils 14 and 15 which are toroidally wound around the annular deflection core 13 and located outside the coil separator 12 and a pair of correction coil devices 16 and 17 which are mounted to the holding parts 18 on the wall 12b at the electron gun side of the bulged part 12a of the coil separator 12 into which the electron gun ends of said coils are positioned. Each holding part is provided with the portion for sliding which permits sliding of the cores 16a and 17a in the axial direction of the neck so that the cores 16a and 17a can be symmetrically mounted in reference to the deflection axis. The terminal plate 19 is fitted to the top of the bulged part 12a and provided with the variable resistor 28 and the rectifying circuit 29 as shown in FIG. 6 and these variable resistor and rectifying circuit 29 are connected to the vertical deflection coils 14 and 15.

The horizontal deflection coils generate a pincushion type horizontal deflection magnetic field and the vertical deflection coils 14 and 15 generate a barrel type vertical deflection magnetic field. In the present invention, the deflection yoke apparatus is constructed so that the misconvergence $X_H$ at both ends of the X axis of the screen is eliminated to approximately zero by varying or adjusting the shape and/or conductor distribution of the horizontal deflection coils and the misconvergence in the vertical direction, that is, the cross misconvergence PQv at the end parts in the diagonal directions of the screen is eliminated to approximately zero by varying or adjusting the shape and/or conductor distribution of the vertical deflection coils, and the misconvergence which necessarily remains for the design of the deflection yoke, that is, the amount of trilemma is caused to take place intensively as the misconvergence amount $Y_H$ in the horizontal direction at the upper and lower end parts in the Y axis direction of the screen, not as the misconvergence which is difficult to eliminate by conventional various correcting means.

Figure 4:
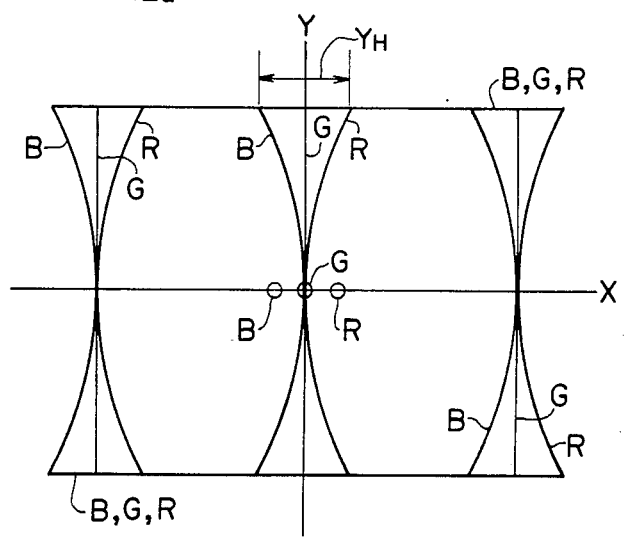
FIG. 4 shows a misconvergence of rasters appearing on the screen when the correction current is not supplied to the correction coil device of the deflection yoke apparatus in accordance with the present invention.

If the deflection yoke is constructed as described above, three rasters produced by three electron beams on the fluorescent screen are approximately aligned in the vertical direction but the paraboloidal misconvergence remains in the horizontal direction, as observed at the upper and lower parts of the screen as shown in FIG. 4. This misconvergence amount $Y_H$ is adjusted to approximately zero by the correction coil devices.

Figure 5:
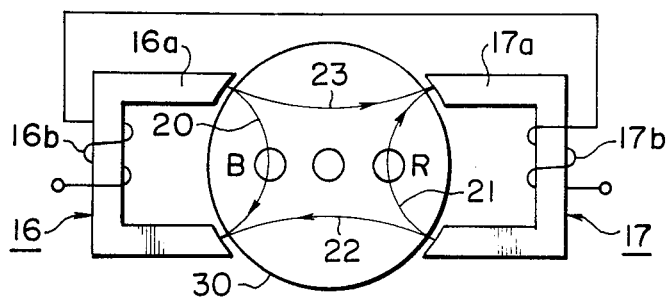
FIG. 5 is a drawing for explaining the operation of the correction coil device.

The correction coil devices 16 and 17 are arranged at both sides of in-line arrangement of three electron beams B, G and R outside the neck 30 of the cathode-ray tube as shown in FIG. 5. The correction coil device comprises the U-shaped magnetic cores 16a and 17a and the correction coils 16b and 17b wound around the magnetic cores. The magnetic cores 16a and 17a are opposed each other so that the magnetic fluxes 20, 21, 22 and 23 pass through the neck 30 of the cathode-ray tube and the correction coils 16b and 17b are connected to generate the magnetic flux in the arrowhead direction. The correction coils are connected to the correction circuit, for example, as shown in FIG. 6.

Figure 7A:
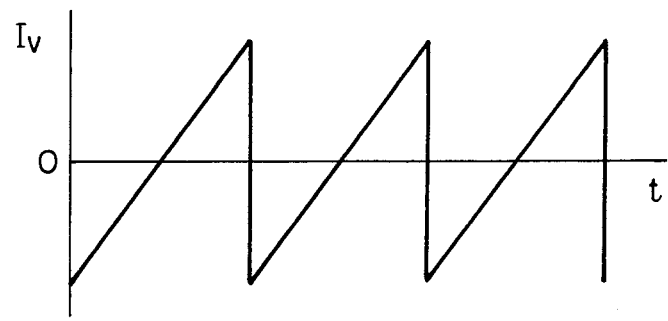
FIG. 7A shows a waveform of the vertical deflection current.
Figure 7B:
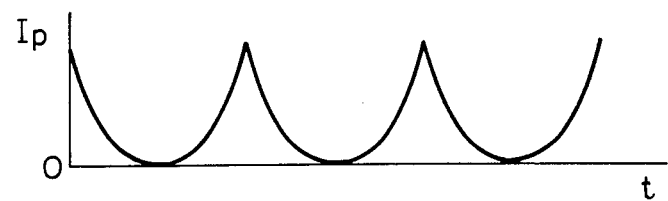
FIG. 7B shows a waveform of the correction current which flows in the coil of the correction coil device.

In FIG. 5, a pair of vertical deflection coils 14 and 15 and the variable resistor 28 are connected in series to the vertical deflection circuit 27. The double-wave rectifying circuit 29 is connected to both ends of the variable resistor 28. The correction coils 16b and 17b are connected in series to this rectifying circuit 29 and the rectified current is supplied. In other words, the deflection current Iv of sawtooth waveform as shown in FIG. 7A is supplied from the vertical deflection circuit 27 to the deflection coils 14 and 15 while the correction current Ip of paraboloidal waveform which is full-wave rectified by the rectifying circuit 29 is supplied to the correction coils 16b and 17b. This paraboloidal waveform in formed owing to the conduction characteristic of the diode, and the cycle of correction current Ip is the same as the cycle of the vertical deflection current.

The following describes the convergence operation by the correction coil device. As shown in FIG. 4, the misconvergence with the amount of trilemma of only $Y_H$ due to the deflection magnetic field is produced on the screen. As shown in FIG. 5, the correction magnetic flux 20 generated from the magnetic core 16a converges the electron beam R onto the electron beam G and the magnetic flux 21 from the magnetic core 17a converges the electron beam B onto the electron beam G. Magnetic fluxes 22 and 23 equally act on three electron beams and do not therefore affect the convergence of the electron beams. The misconvergence $Y_H$ becomes larger toward the upper and lower sides of the screen and the current flows more at the beginning and the end of one cycle of the correction current Ip and becomes approximately zero after lapse of the half cycle. Thus, the misconvergence $Y_H$ is corrected over the full range of the screen and a satisfactory convergence is obtained. The magnitude of convergence is adjusted by varying the resistance value of the variable resistor 28.

Figure 8:
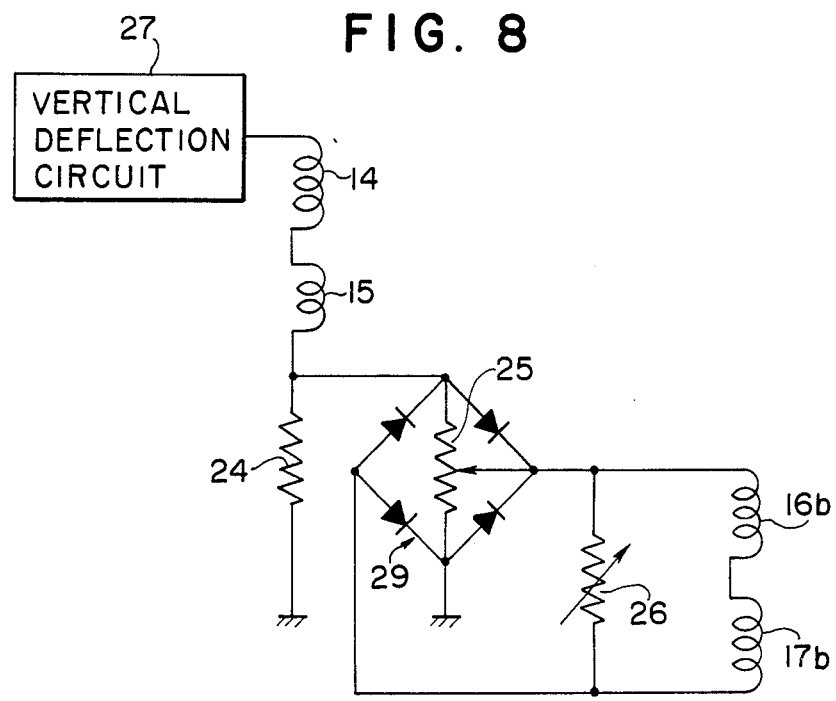
FIGS. 8 and 9 are respectively a circuit connection diagram of another embodiment of the correction coil device included in the deflection yoke apparatus in accordance with the present invention.

FIG. 8 shows another embodiment of the circuit connection of the correction coil device. If the variable resistor 28 is adjusted to a great extent in the circuit shown in FIG. 6, the vertical widths of the rasters vary. In this circuit, the fixed resistor 24 is connected in series to the vertical deflection coils 14 and 15 and the rectifying circuit 29 is connected to both ends of this fixed resistor 24. The variable resistor 26 for adjusting the misconvergence $Y_H$ is connected in parallel with the correction coils 16b and 17b. The potentiometer 25 is connected in parallel with the fixed resistor 24 and the tilt of the electron beam arrangement against the X axis can be adjusted by supplying the divided voltage together with the output of the rectifying circuit 29 to the correction coils 16b and 17b. This potentiometer 25 is fitted to the terminal plate 19.

Figure 9:
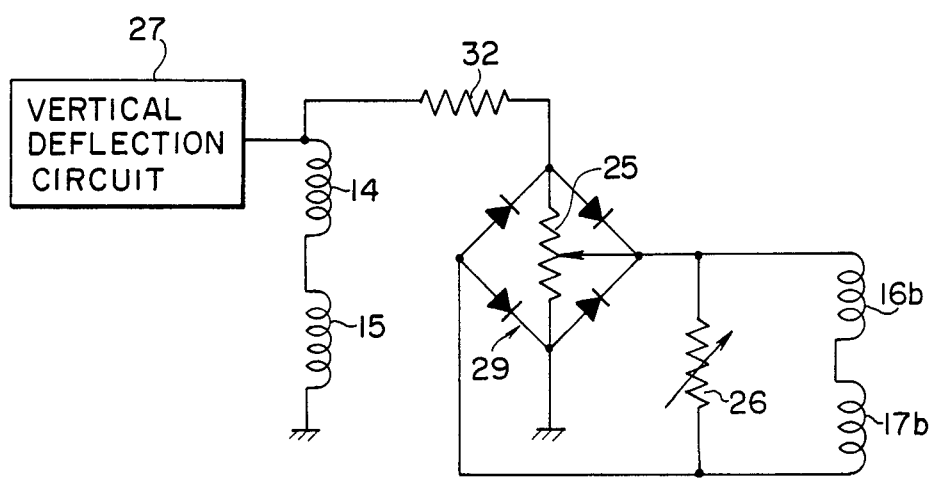

FIG. 9 shows another circuit connection of the correction coil device. In FIG. 8, the vertical deflection circuit is used in the deflection yoke apparatus which provides high impedance and, in FIG. 9, the vertical deflection circuit is used in the deflection yoke apparatus which is required to provide low impedance. The vertical deflection circuit shown in FIG. 9 differs from that in FIG. 8 in that the fixed resistor 24 is removed and the resistor 32 is connected in series to the potentiometer 25. The operation is the same as that in FIG. 8.

For mounting the correction coil devices 16 and 17 and on the deflection yoke, the magnetic cores 16a and 17a can be arranged between the rear end of the deflection core 13 and the bulged part 12a of the coil separator 12 without limiting to said embodiments.

Conventionally known circuits can be used as the circuits for generating the paraboloidal wave current.

What is claimed is:

1. A deflection yoke apparatus which is mounted on a neck of a cathode ray tube in which three electron guns are arranged in-line and rasters are produced on a screen by electron beams emitted from said electron guns, comprising:

(a) a deflection yoke which comprises a pair of saddle type horizontal deflection coils which have rear rise parts and generate a pincushion type horizontal deflection magnetic field, a coil separator which has a bulged part for fixing said coils inside the coil separator and housing said rear parts, a pair of vertical deflection coils which are arranged outside said coil separator and generate a barrel type vertical deflection magnetic field, and an annular deflection core which forms a part of a magnetic path of magnetic flux generated from said both coils and is constructed so that misconvergence $X_H$ at both ends of the horizontal axis X of the screen is eliminated to approximately zero and a cross misconvergence $PQ_V$ at the end parts in the diagonal direction of screen is eliminated to approximately zero, thereby a remaining misconvergence being intensively provided as the amount $Y_H$ in the horizontal direction at the upper and lower end parts in the vertical axis direction Y of the screen, when three beams are deflected by said deflection magnetic field;

(b) a pair of correction coil means which comprise a pair of U-shaped magnetic cores and correction coils wound around said magnetic cores and are fitted to the bulged part of said coil separator to generate a correction magnetic field in the neck of said cathode-ray tube and dynamically converging said electron beams over the full range of the screen;

(c) a correction current source comprising a rectifying circuit which produces a non-modulated parabolic correction current synchronized with the vertical deflection current;

(d) a variable voltage divider being connected in parallel with said correction current source and adjusting a waveform of said correction current flowing in said correction coil;

(e) a circuit means for forming an adjustable resistor circuit respectively connected in parallel with two diodes of said rectifying circuit and supplying the correction current of the correction current source to the correction coils, thereby adjusting the tilt of the electron beam arrangement against the horizontal axis X; and (f) a correction current adjusting means for adjusting the correction current flowing in said correction coil, thereby adjusting the amount of the correction current.

2. A deflection yoke apparatus in accordance with claim 1, wherein said coil separator including a bulged part is provided with an isulation plate to which a correction current source and a current adjusting means are fitted.

3. A deflection yoke apparatus in accordance with claim 2, wherein said variable voltage divider is fitted to said insulation base plate.

4. A deflection yoke apparatus in accordance with claim 1, wherein said correction current adjusting means is formed as a variable resistor and connected in parallel with said correction coils.

5. A deflection yoke apparatus in accordance with claim 1, wherein a holding part to which a correction coil device is fitted is provided on the bulged part of said coil separator.

6. A deflection yoke apparatus in accordance with claim 1, wherein said correction coil means are provided with a U-shaped magnetic core and fixed on the coil separator to oppose each other in the direction on the in-line arrangement of the electron beams.

* * * * *